(12) United States Patent
Akopian et al.

(10) Patent No.: US 6,771,215 B2
(45) Date of Patent: Aug. 3, 2004

(54) DETERMINATION OF THE TRANSMISSION TIME OF A SIGNAL PART IN A POSITIONING SYSTEM

(75) Inventors: David Akopian, Tampere (FI); Harri Valio, Kammennienmi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/402,340

(22) Filed: Mar. 27, 2003

(65) Prior Publication Data

US 2004/0027281 A1 Feb. 12, 2004

(30) Foreign Application Priority Data

Mar. 28, 2002 (WO) .............................. PCT/IB02/00985

(51) Int. Cl.⁷ ................................................ G01S 5/14
(52) U.S. Cl. .................................. 342/357.12; 342/387
(58) Field of Search ............................ 342/357.12, 387

(56) References Cited

U.S. PATENT DOCUMENTS

| | | | |
|---|---|---|---|
| 6,295,024 B1 | 9/2001 | King et al. | |
| 6,346,911 B1 | 2/2002 | King | |
| 6,618,006 B1 * | 9/2003 | Syrjarinne | 342/357.12 |
| 2004/0041728 A1 * | 3/2004 | Bromley et al. | 342/357.12 |

FOREIGN PATENT DOCUMENTS

| | | |
|---|---|---|
| EP | 1115008 | 7/2001 |
| EP | 1248117 | 10/2002 |
| JP | 01228233 | 8/2001 |
| JP | 01305205 | 10/2001 |
| JP | 02040125 | 2/2002 |

OTHER PUBLICATIONS

"Possibilities for GPS Time Recovery With GSM Network Assistance," by Jari Syrjarinne.
"Time Recovery Through Fusion of Inaccurate Network Timing Assistance With GPS Measurements," by Jari Syrjarinne.
"Global Positioning System Overview," by Peter H. Dana, publication from website http://www.colorado.edu/geography/gcraft/notes/gps/gps.html.

* cited by examiner

Primary Examiner—Gregory C. Issing
(74) Attorney, Agent, or Firm—Ware, Fressola, Van Der Sluys & Adolphson LLP

(57) ABSTRACT

The invention relates to a method for determining the time of transmission of a signal part of a code modulated signal transmitted by a beacon of a positioning system and received by a receiver of the positioning system. In order to enable such a determination in weak signal conditions, it is proposed that measured subcomponents of the time of transmission of at least two signal parts are compared with corresponding predicted subcomponents in a way resulting in a combined difference for all signal parts. The comparison is performed for a plurality of assumed errors in the predicted subcomponent. The accurate time of transmission of a signal part is then determined based on the determined error value which results in the smallest combined difference. The invention relates equally to a corresponding receiver and to a corresponding positioning system.

26 Claims, 1 Drawing Sheet

DETERMINATION OF THE TRANSMISSION TIME OF A SIGNAL PART IN A POSITIONING SYSTEM

CROSS REFERENCE TO RELATED APPLICATIONS

This application claims priority under 35 USC §119 to International Patent Application No. PCT/IB02/00985 having an international filing date of Mar. 28, 2002.

FIELD OF THE INVENTION

The invention relates to a method for determining an accurate time of transmission of a signal part of a code modulated signal transmitted by a beacon of a positioning system and received by a receiver of said positioning system, which receiver tracks beacons signals with a tracking unit. The invention relates equally to a corresponding receiver and to a positioning system comprising a receiver.

BACKGROUND OF THE INVENTION

A well known positioning system which is based on the evaluation of signals transmitted by beacons is GPS (Global Positioning System). The constellation in GPS consists of more than 20 satellites employed as beacons that orbit the earth. The distribution of these satellites ensure that usually between five and eight satellites are visible from any point on the earth.

Each of the satellites, which are also called space vehicles (SV), transmits two microwave carrier signals. One of these carrier signals L1 is employed for carrying a navigation message and code signals of a standard positioning service (SPS). The L1 carrier phase is modulated by each satellite with a different C/A (Coarse Acquisition) Code. Thus, different channels are obtained for the transmission by the different satellites. The C/A code, which is spreading the spectrum over a 1 MHz bandwidth, is repeated every 1023 bits, the epoch of the code being 1 ms. The carrier frequency of the L1 signal is further modulated with navigation information at a bit rate of 50 bit/s, which information comprises in particular ephemeris and almanac data. Ephemeris parameters describe short sections of the orbit of the respective satellite. Based on these ephemeris parameters, an algorithm can estimate the position and the velocity of the satellite for any time while the satellite is in the respective described section. The orbits which are calculated based on ephemeris parameters are quite accurate, but the ephemeris parameters are only valid for a short time, i.e. for about 2–4 hours. The almanac data, in contrast, contain coarse orbit parameters. The orbits calculated based on almanac data are not as accurate as the orbits calculated based on ephemeris data, but they are valid for a longer time, a week or even more. Almanac and ephemeris data also comprise clock correction parameters which indicate the current deviation of the satellite clock versus a general GPS time.

Further, a time-of-week TOW count is reported every six seconds as another part of the navigation message.

A GPS receiver of which the position is to be determined receives the signals transmitted by the currently available satellites, and a tracking unit of the receiver detects and tracks the channels used by different satellites based on the different comprised C/A codes. The receiver first determines the time of transmission of the ranging code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits.

Based on the time of transmission and the measured time of arrival TOA of the ranging code at the receiver, the time of flight TOF required by the ranging code to propagate from the satellite to the receiver is determined. By multiplying this TOF with the speed of light, it is converted to the distance between the receiver and the respective satellite. The computed distance between a specific satellite and a receiver is called pseudo-range, because the general GPS time is not accurately known in the receiver. Usually, the receiver calculates the accurate time of arrival of a ranging code based on some initial estimate, and the more accurate the initial time estimate is, the more efficient are position and accurate time calculations. A reference GPS time can, but does not have to be provided to the receiver by a network.

The computed distances and the estimated positions of the satellites then permit a calculation of the current position of the receiver, since the receiver is located at an intersection of the pseudo-ranges from a set of satellites. In order to be able to compute a position of a receiver in three dimensions and the time offset in the receiver clock, the signals from four different GPS satellite signals are required.

If navigation data are available on one of the receiver channels, the indication of the time of transmission comprised in a received signal can also be used in a time initialization for correcting a clock error in the receiver. In GPS, an initial time is needed for the positioning. For the initial time estimate, the average propagation time of satellite signal of around 0.070 seconds is added to the time of transmission of a ranging code extracted from the navigation information. The result is used as initial estimate of the time of arrival of a ranging code, which estimate lies within around 20 ms of the accurate time of arrival. The receiver then determines for different satellites the time at which a respective ranging code left the satellite. Using the initial estimate of the current time, the receiver forms pseudorange measurements as the time interval during which the respective ranging code was propagating from the satellite to the receiver either in seconds or in meters by scaling with the speed of light. After the position of the receiver has been calculated from the determined pseudoranges, the accurate time of arrival can then be calculated from standard GPS equations with an accuracy of 1 $\mu$s.

However, in order to be able to make use of such a time initialization, the navigation data from a satellite signal is needed. Currently, most of the GPS receivers are designed for outdoor operations with good signal levels from satellites. Thus, only good propagation conditions ensure that the navigation data required for the described time initialization is available.

In bad propagation conditions, in contrast, it may not be possible to extract the navigation message accurately enough from received satellite signals, since a high bit-error rate and weak signal levels make a robust decoding of navigation bits impossible. Such bad propagation conditions, which are often given indoors, render the time initialization and the pseudorange measurements more difficult.

For those cases in which the standard time initialization methods cannot be applied since the navigation data are noisy, the time initialization process for the receiver can be performed by a time recovery method. Some known time recovery methods are based on the cross-correlation of a part of a tracked signal and an expected signal part to define the time of transmission.

Cross-correlation methods allow for determining the system time with an accuracy of one microsecond. It is a disadvantage of cross-correlation methods, however, that they require raw navigation data and a reference time with an accuracy of 6–30 seconds.

For the case that only submillisecond or sub-20 millisecond measurements of the time of transmission are available, e.g. from epoch and chip counts in the tracking unit of the receiver, it has been proposed to use a search technique over the possible GPS time which minimizes the sum of squared residuals or errors (SSE). Such a method has been presented by J. Syrjarinne in "Time recovery through fusion of inaccurate network timing assistance with GPS measurement", Proc. 3rd Int. Conference on Information Fusion, Paris, France, July 10–13 2000, Vol. II, pp.WeD5–3-WeD5–10, and in "Possibilities for GPS Time recovery with GSM Network Assistance", in Proc. ION GPS 2000, Salt Lake City, Utah, USA, Sep. 19–22 2000].

Moreover, a 5-dimensional Least Square approach has been proposed to find the position and the time based only on submillisecond or sub-20 millisecond measurements of the time of transmission at the receiver.

Both approaches have the disadvantage, though, that they rely on at least 5 visible satellites for determining the position and the system time.

SUMMARY OF THE INVENTION

It is an object of the invention to enable an estimation of the most probable time of transmission of a signal part of a beacon signal in weak signal conditions, in which less than five beacons are visible at the receiver and in which navigation data cannot be read from the received signals.

This object is reached with a method for determining an accurate time of transmission of a signal part of a code modulated signal transmitted by a beacon of a positioning system and received by a receiver of the positioning system, which receiver tracks beacon signals with a tracking unit.

In a first step of the proposed method, a subcomponent of the time of transmission of at least two signal parts is obtained from the tracking unit of the receiver. The subcomponent, which is measured by the tracking unit, indicates the difference in time between a detected regularity in a beacon signal comprising the respective signal part and the respective signal part itself.

In a second step of the proposed method, a plurality of expected subcomponents are predicted for each of the signal parts. The prediction is based on available estimates of the time of arrival and of the time of flight of the respective signal part. It is to be noted that the estimates may be available indirectly. The estimate of the time of flight might be obtained e.g. from available estimates of the position of the receiver and of the position of the respective beacon. For each predicted subcomponent for one signal part, a different total error within a known interval of possible total errors is assumed. Such a known interval can be known implicitly with known possible maximum errors for the estimates employed for determining the subcomponents.

In a third step of the proposed method, the combined difference between the measured and the expected subcomponent for each of the at least two signal parts is determined for each of the expected subcomponents separately. Thus, a combined difference is determined for each of the error values.

In a last step of the proposed method, the estimated time of transmission of at least one signal part is calculated. The calculation is taking into account the total error resulting in the smallest combined difference between an measured and an expected subcomponent.

The object of the invention is also reached with a receiver comprising means for receiving and tracking signals from at least one beacon and processing means for realizing the proposed method.

The object of the invention is further reached with a positioning system comprising a receiver and at least one network element of a network. This network may be a mobile communication network or any other network. The receiver again comprises means for receiving and tracking signals from at least one beacon and processing means for realizing the steps of the proposed method. In addition, the receiver comprises means for communicating with the network.

Finally, the object of the invention is reached according to the invention with a positioning system, in which the steps of the proposed method are realized by a processing unit of the system which is external to a receiver of the system. The receiver includes in this case means for receiving and tracking signals from at least one beacon and means for providing received and tracked beacon signals to the processing unit. The processing unit can also include other functions. It can be given e.g. by a mobile station to which the receiver is connected and which is able to communicate with a mobile communication network for receiving pieces of information. It can also be given by a network element of a network, in which required assistance data are available.

The invention proceeds from the consideration that the tracking unit of a receiver will often even be able to track received beacon signals of which contained information cannot be decoded. In such beacons signals, the tracking unit is further usually able to detect the place of a signal part, e.g. of the ranging code, of which the time of transmission is to be determined. Since the tracking is based on the codes which are repeated in known epochs, the tracking unit is at least able to count the epoch edges of any tracked signal. Sometimes, the tracking unit will in addition be able to detect bit edges in the signal. Thus, there exists an exact measurement for a subcomponent of the time of transmission of a signal part. This subcomponent determines in particular the time difference between a detected and time-stamped epoch or bit edge in the signal and the time of arrival of this signal part, i.e. the subcomponent determines the relative position of the signal part in a beacon signal. This time difference is the same as the time difference between the time of transmission of the detected epoch or bit edge and the time of transmission of the signal part. Such a time difference can be determined reliably in the tracking unit by an integer and fractional chip count and also by an epoch count if a bit edge is found. In GPS signals, for instance, the bit edges change every 20 ms and the epochs change every millisecond. The time subcomponent can thus be in particular either a submillisecond component or a sub 20 millisecond component.

The invention proceeds further from the consideration that the time of transmission of a detected part of a tracked beacon signal can be estimated, in case an initial reference time at the receiver, an initial reference position of the receiver, and an estimated time of flight of the signal required for propagating between the beacon and the receiver is available at the receiver.

Usually, also the maximum possible error is known for these estimates, thus the time of transmission can be determined with a total error lying within a known error interval.

Finally, the invention proceeds from the consideration that the subcomponent of the time of transmission of a part of a tracked beacon signal can be estimated separately based on the same time estimates as the entire time of transmission with the same known maximum total error. Thus, the difference between the measured subcomponent and an the estimated subcomponent can be determined for each or for selected ones of the possible total errors. In order to obtain a reliable result, the difference for each total error should be determined as combined difference for at least two different signal parts. The resulting minimum difference can be assumed to be associated to the correct total error.

This correct total error can then be employed for determining a quite accurate time of transmission of at least one signal part of a tracked beacon signal.

The invention is thus based basically on the equivalent of a cost function, which is minimized. Since the time subcomponents have a known scale, the cost function can be set up in a way that is has discrete time intervals. This restricts the evaluation of different possible error values to a limited, and still comprehensive number.

It is an advantage of the invention that the time of transmission of a signal part can be determined with an accuracy of one second by a single processing iteration at the receiver, while requiring signals from less than 5 beacons. The accuracy of the reference time can be several minutes, e.g. 5–10 minutes or more, and the reference position has to be known only with an accuracy of about 30 km, or even more.

It is further an advantage of the invention that the determined time of transmission of a signal part originating from one beacon can be used for determining the time of transmission of signals parts originating from other beacons. The time of transmission of other beacons can be determined e.g. with an accuracy of ±10 to ±100 chips depending on the accuracy of the reference position. Thus, the invention can be used for a fast and more sensitive re-acquisition.

It is also an advantage of the invention that the navigation data in the received signal parts does not have to be available for determining a time of transmission. Further, available parameters employed in the calculations of the method according to the invention, e.g. reference time and reference position, do not have to be as accurate as for the known cross-correlation methods.

Preferred embodiments of the invention become apparent from the subclaims.

In a first preferred embodiment of the invention, the at least two signal parts originate from a single beacon. They are thus comprised in a single beacon signal, but are transmitted at different instances of time. This embodiment of the invention has the advantage over the state of the art that only a single beacon has to be visible for the receiver in order to be able to perform a time-recovery.

In a second preferred embodiment of the invention, the at least two signal parts are comprised in beacon signals originating from at least two different beacons. Advantageously, though not necessarily, the different signal parts are received by the receiver at the same instant of time. This embodiment has the advantage over the state of the art that as a minimum, only signals from two beacons are required instead of signals from five beacons.

The features of these two embodiments can also be combined to a further advantageous embodiment of the invention.

The combined differences between measured and expected time subcomponents can be determined in any suitable way. The differences may be calculated for instance as the sum of the absolute differences resulting for each of the at least two signal parts for a specific error value, or as the sum of the squared differences resulting for each of the at least two signal parts for a specific error value. The search for the minimum of the combined difference between the measured and the expected time subcomponents could be made particularly fast by using an integer least squares method.

The calculation of the time of transmission of a signal part may comprise as well a known correction value, which compensates e.g. for atmospheric influences, the current clock error of the beacon etc. Such a correction value may be determined in particular based on available navigation data.

The determined time of transmission of a signal part can be employed in particular for determining the time of arrival of this signal part, and thus for determining the accurate system time at the receiver in order to correct the local clock error. The time of arrival of a signal part can be determined like the time of transmission with an accuracy of one second. The accuracy of the receiver time will thus increase for example by 300 times, when proceeding from a reference time having an accuracy of five minutes to a corrected receiver time having an accuracy of one second.

The corrected receiver time can then be employed e.g. for determining the accurate time of transmission of signal parts from other beacons and for determining the exact position of the receiver from calculated pseudoranges between the receiver and the respective beacons as explained above.

The corrected receiver time can also be employed as a basis for a further refinement of the receiver time with another method. For instance, a known cross-correlation method could be based on the corrected receiver time for determining a particularly accurate system time at the receiver.

In case the receiver is part of a positioning system comprising a network element of a network, the processing in the receiver can be supported by the communication network. The network can provide e.g. the required time estimates, an information on the maximum possible errors of estimates and/or other assistance data. The network element comprises to this end means for providing the receiver with assistance data. As mentioned above, the network providing assistance data can be a mobile communication network, but it can also be any other kind of network which is capable of providing assistance data via a network element, e.g. via a DGPS (Differential Global Positioning system) station.

It is to be noted, though, that all required assistance data can also be available within the receiver itself. A receiver may for example be able to operate as a standalone receiver, which receives and decodes the navigation message in received beacon signals, initializes the time, etc., as long as it is situated outside. Therefore, the receiver is in possession of the necessary orbital parameters, e.g. ephemeris, and the internal clock is calibrated and will be quite accurate for some time. Also the receiver position is likely not to change by more than 30 km for some time. If the receiver is then moved e.g. into a building in which the navigation message of received beacon signals cannot be decoded, the method according to the invention can be thus used based on the available data within the receiver and without external assistance data.

Preferably, though not necessarily, the method according to the invention is implemented as software.

The beacons can be in particular, though not exclusively, satellites or a base stations of a network.

Preferably, though not necessarily, the receiver is a GPS receiver and the beacons are a GPS space vehicles.

BRIEF DESCRIPTION OF THE FIGURES

Other objects and features of the present invention will become apparent from the following detailed description of an exemplary embodiment of the invention considered in conjunction with an accompanying drawing. The only figure.

DETAILED DESCRIPTION OF THE INVENTION

Figure 1:
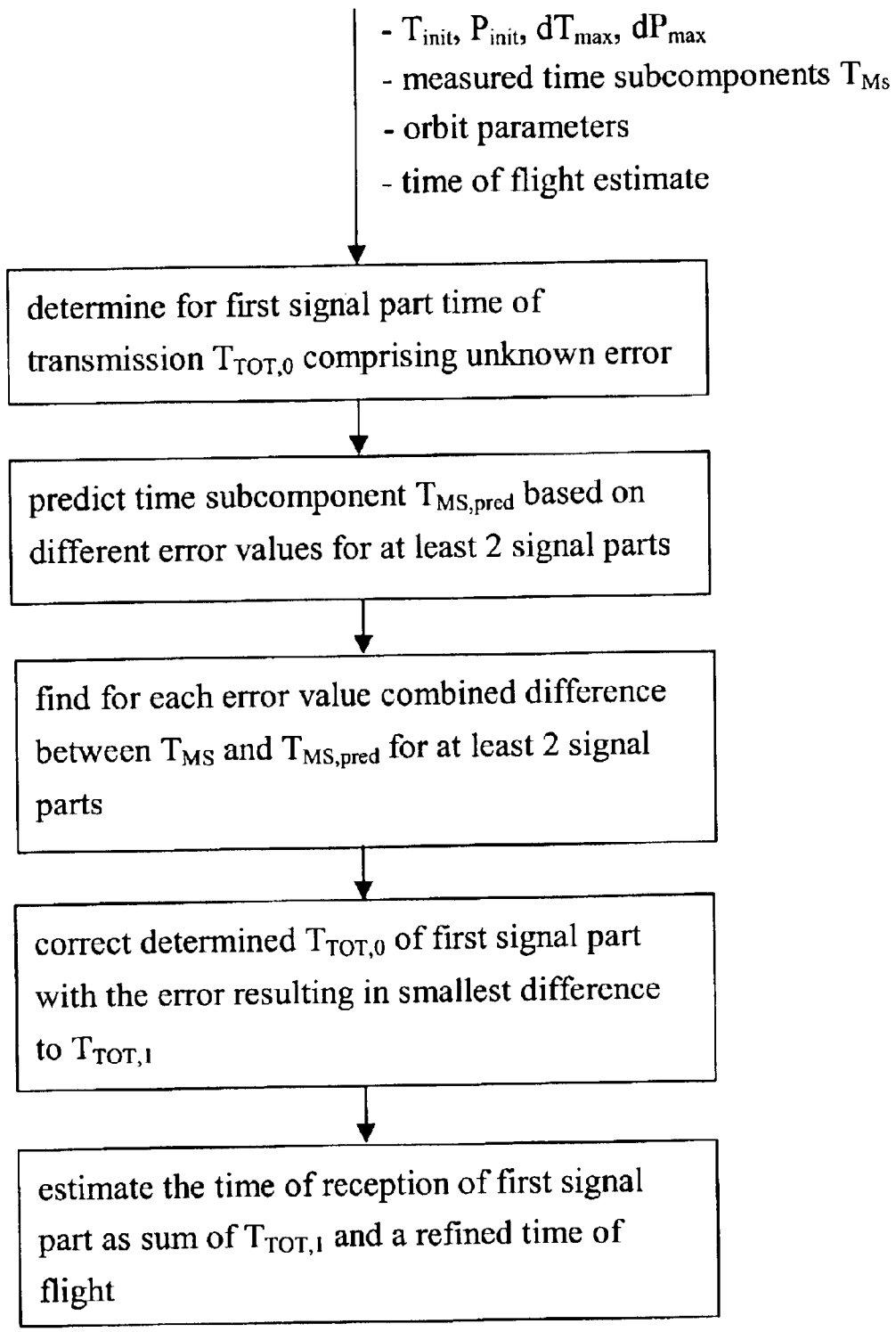
FIG. 1, is a flow chart illustrating the main steps of two embodiments of the method according to the invention.

The flow chart of FIG. 1 illustrates in a general way two embodiments of the method according to the invention.

The method is implemented as a software algorithm in a processing unit of a GPS receiver of a GPS positioning system. Several satellites of the GPS system transmit code modulated signals as described above. The signals transmitted by the satellites are received by the GPS receiver and tracked by a tracking unit of the receiver. The tracking unit is able to detect at least epoch edges in the received signal and the arrival of ranging codes included in the signals.

Both embodiments of the method according to the invention are employed for determining the system time of the GPS system at the receiver by determining the accurate time of arrival $T_{curr}$ of a ranging code from at least one satellite.

The first embodiment is based on different consecutive ranging codes transmitted by a single satellite. The second embodiment, in contrast, is based on different ranging codes transmitted by at least two satellites at the same instance of time.

For both embodiments, several values are provided to the algorithm.

The provided values comprise an initial time estimate of the time of arrival $T_{init}$ of the received ranging codes, an initial reference position of the receiver $P_{init}$, and the maximal possible error in time for both time estimates, $dT_{max}$ and $dP_{max}$ respectively. In case the GPS receiver comprises the functionality of a mobile phone or is connected to such a mobile phone, these values may be provided e.g. by a network to which the receiver is connected. Otherwise, these values can be available within the GPS receiver.

Further provided are measurements from the tracking unit. More specifically, for each ranging code on which the respective method is to be based, a subcomponent $T_{Ms}$ of the time of transmission of the respective ranging code is provided. Each subcomponent $T_{Ma}$ is a sub M seconds component of the time of transmission. In case the tracking unit is able to perform a bit-synchronization on the received signals, the subcomponent is a sub 20 ms (M=0.020 s) component of the time of transmission, i.e. the difference between the time of transmission of the last detected bit edge and the time of transmission of the ranging code. Otherwise, the measurement is based on a chip count for the received signals, resulting in a sub 1 ms (M=0.001 s) component. In the latter case, the subcomponent corresponds to the difference between the time of transmission of the last detected epoch edge and the time of transmission of the respective ranging code. When the receiver tracks the signal, the tracking unit may determine for example that the last epoch (1 ms) edge appeared at a specific chip counter reading N1, while the last chip counter reading is N2. Since a chip has a known duration of 1 μs, the difference in time $T_{Ms}$ can be calculated from the chip count. In addition, local clock measurements $T_{clock}$ are provided by the tracking unit to the algorithm.

Another value provided to the algorithm is an initial estimate of the time of flight $T_{TOF}$ of the received ranging codes, which may simply be set to an average value of $T_{TOF}$=70 ms. This value may be stored in particular in the receiver.

Finally, orbit parameters may be provided for the tracked satellites, e.g. ephemeris or almanac, correction information on the clock errors of the tracked satellites, or compensation for errors due to the atmosphere. The orbit parameters may be provided for example in an assistance message from a network, to which the GPS receiver is connected or could be available within the receiver from earlier sessions.

For the first embodiment of the invention, the following calculations are performed by the algorithm based on the received information:

In a first step in the flow chart of FIG. 1, an initial estimate $T_{TOT,0}$ of the transmission time of a first ranging code is determined. This can be done for example based on the equation:

$$T_{TOT,0} = \text{floor}(0.5 + (T_{init} - T_{TOF} - T_{Ms} - \text{Corrections})/M)*M + T_{Ms}$$

In this equation, the value "Corrections" is optionally included. It is determined based on received orbital parameters and compensates for the atmosphere, the SV clock error etc. The function floor( ) has as an output the closest integer not exceeding the value of the argument.

The initial estimate of the time of transmission in this equation can be assumed to be correct apart from a possible error, which is given by an integer k times M seconds. Since this error results from the inaccuracy of the provided time estimates, the maximum total error of the initial estimate of the time of transmission can be determined based on the provided maximum possible errors $dT_{max}$ and $dP_{max}$.

The correct time of transmission $T_{TOT}$ is thus given by $$T_{TOT} = T_{TOT,0} + kM, \text{ with } k = -K_{max}, \ldots, K_{max},$$

where kM constitutes the error of the initial estimate of the time of transmission $T_{TOT,0}$ and where $K_{max}$ is determined by $dT_{max}$ and $dP_{max}$. Normally, for sub 1 ms measurements it is possible to cope with an error dPmax of a few kilometers, while for sub 20 ms measurements it is possible to cope with an error dPmax which is 20 times higher.

The next steps of the first embodiment of the invention therefore aims at finding the correct error value k for the preceding equation. This is achieved by comparing the measured $T_{Ms}$ values with estimated $T_{Ms}$ values.

The estimated $T_{Ms}$ values are determined in the second step indicated in FIG. 1 based on the same erroneous estimates as the initial estimate of the time of transmission $T_{TOT,0}$. The time subcomponent $T_{Ms}$ has to be estimated for each ranging code for each value of k within the interval $[-K_{max}, K_{max}]$.

To this end, for each value of k, an assumedly correct time of transmission $T_{TOT,1} = T_{TOT,0} + kM$ is formed for the first one of the received ranging codes.

Further, the position of the satellite is determined for the time of transmission of the first one of the received ranging codes. The position can be determined based on standard equations using the estimated time of transmission and available orbit parameters, i.e. ephemeris or almanac, and possibly different correction values.

Then, a refined time of flight $T_{TOF,1}$ of the first ranging code is determined by dividing the distance between the estimated position of the receiver and the calculated satellite position by the speed of light.

The current GPS time $T_{curr,1}$ at the time of arrival of the first ranging code is moreover estimated to be $T_{curr,1} = T_{TOT,1} + T_{TOF,1}$.

Based on the current time estimate $T_{curr,1}$ for the first ranging code, the current time estimate for the second ranging code is determined, and equally for all other ranging codes the respective current time estimate for the next ranging code $T_{curr,next}$ from the respective time estimate of the previous ranging code $T_{curr,previous}$. The equation employed to this end is:

$$T_{curr,next} = T_{curr,previous} + (T_{clock,next} - T_{clock,previous}).$$

The resulting current time estimates $T_{curr,i}$ for all received ranging codes are used for refining the time of flight $T_{TOF,i}$ of all received ranging codes as described for the first received ranging code. The index i represents the respective measurement instance, i.e. it constitutes a reference to the respective one of the ranging codes.

Now, the subcomponent $T_{Ms,i,pred}$ is determined, which should be expected for each of the received ranging codes from the tracking unit when tracking the satellite:

$$T_{Ms,i,pred} = mod(T_{curr,i} - T_{TOF,i} - \text{Corrections}, M),$$

The right hand side of the equation constitutes the residual of the division of $T_{curr,i} - T_{TOF,i}$ by M seconds, wherein the difference $T_{curr,i} - T_{TOF,i}$ may be corrected with a known correction value. The index i represents again the respective measurement instance. As explained above, M can be either 0.001 s or 0.020 s. The value "Corrections" in the equation can, but does not have to be included. It may comprises e.g. ionosperic corrections, tropospheric corrections, group delay corrections, corrections of the satellite clock and relativistic corrections.

The above calculations are performed for each integer k in the determined interval $[-K_{max}, K_{max}]$.

In the third step indicated in FIG. 1, the difference between the measured subcomponents $T_{Ms}$ provided by the tracking unit and the predicted subcomponents $T_{Ms,pred}$ is determined for each error k.

The difference is determined separately for each error value k, but combined for all ranging codes, as prediction error $d_{Tpred}$ by the equation:

$$dT_{pred} = \sum_{i} |T_{Ms,i,pred} - T_{Ms,i}|$$

where i refers again to the respective ranging code.

The value of k which results in the lowest prediction error $d_{Tpred}$ is assumed to constitute the correct error $k_{best}$. Thus, the most probable accurate time of transmission $T_{TOT,1}$ for the first ranging code can be calculated according to an equation indicated further above to be:

$$T_{TOT,1} = T_{TOT,0} + k_{best}M + \text{Corrections},$$

This calculation is indicated in the fourth step of FIG. 1. The value "Corrections" in the equation is used to further compensate for a bias in the determined time of transmission due to errors of the satellite clock and to atmospheric and relativistic effects, as far as parameters are available for such a compensation.

In the last step of FIG. 1, the most probable current time estimate for the time of arrival of the first ranging code is calculated as:

$$T_{curr,1} = T_{TOT,1} + T_{TOF,1}.$$

This current time estimate $T_{curr,1}$ constitutes at the same time the accurate GPS time at the receiver at the time of arrival of the first ranging code.

The second embodiment of the invention operates quite similarly to the first embodiment. The differences in the implemented algorithm result from the intention to use ranging codes received at the same instance of time from different satellites, not from the same satellite at different instances of time. For the second embodiment, the following calculations are performed by the algorithm based on the above listed received information:

First, the satellite is determined from which the receiver currently receives the best, e.g. the strongest, signals. This satellite will be referred to in the following as master satellite. An initial estimate $T_{TOT,0}$ of the transmission time of a ranging code originating from this master satellite is then determined from the provided values, as indicated in the first step of FIG. 1. As in the first embodiment, the initial estimate $T_{TOT,0}$ can be determined based on the equation:

$$T_{TOT,0} = \text{floor}(0.5 + (T_{init} - T_{TOF} - T_{Ms} - \text{Corrections})/M) * M + T_{Ms}$$

Again as in the first embodiment, the initial estimate of the time of transmission in this equation can be assumed to be correct apart from a possible error, which is an integer k times M seconds, and of which the maximum amount can be determined based on the provided maximum possible error $dT_{max}$ and $dP_{max}$.

The correct time of transmission $T_{TOT}$ is thus equally given by $$T_{TOT} = T_{TOT,0} + kM, \text{ with } k = -K_{max}, \ldots, K_{max},$$

where kM constitutes the error of the initial estimate of the time of transmission $T_{TOT,0}$ and where $K_{max}$ is determined from the maximum possible error values $dT_{max}$ and $dP_{max}$.

The next steps of the second embodiment of the invention aim at finding the correct error value k for the preceding equation. This is achieved again by comparing the measured subcomponent $T_{Ms}$ values with estimated subcomponent $T_{Ms,pred}$ values.

The estimated $T_{Ms}$ values are determined as above in the second step indicated in FIG. 1 based on the same estimates as the initial estimate of the time of transmission $T_{TOT,0}$. A subcomponent $T_{Ms}$ has to be determined for each ranging code for each integral value of k within the interval $[-K_{max}, K_{max}]$.

To this end, for each value of k, an assumedly correct time of transmission $T_{TOT,1} = T_{TOT,0} + kM$ is formed for the ranging code received from the master satellite.

Further, the position of the master satellite is determined for the time of transmission of the ranging code originating from this satellite. The position can be determined again based on standard equations using the estimated time of transmission and available orbit parameters.

Then, from the estimate of the user position and from the calculated master satellite position, a refined time of flight $T_{TOF,1}$ of the ranging code from the master satellite is determined.

The current GPS time $T_{curr}$ at the time of arrival of the ranging code from the master satellite, and thus of the ranging codes from all tracked satellites, is estimated to be $T_{curr}=T_{TOT,1}+T_{TOF,1}$.

Based on the current time estimate for the time of arrival $T_{curr}$ of the ranging code from the master satellite, the respective positions of the other satellites at the time of transmission of the respectively transmitted ranging code are calculated. The resulting positions are used for refining the time of flight $T_{TOF,i}$ of the ranging codes from all satellites, wherein i constitutes a reference to the respective satellite.

Now, the time subcomponent $T_{Ms,i,pred}$ expected for the respective received ranging code from the tracking unit when tracking the satellites is determined from the equation:

$$T_{Ms,i,pred}=mod(T_{curr}-T_{TOF,i}-\text{Corrections},M),$$

wherein i constitutes again a reference to the respective satellite. Again, M can be e.g. either 0.001 s or 0.020 s again the respective measurement instance. As explained above, M can be either 0.001 or 0.020 s. As in the first embodiment of the invention, the value "Corrections" in the equation can, but does not have to be included. It may comprises again e.g. ionosperic corrections, tropospheric corrections, group delay corrections, corrections of the satellite clock and relativistic corrections.

The above calculations are performed for each integral value k in the determined interval $[-K_{max}, K_{max}]$.

In the third step indicated in FIG. 1, the difference between the measured subcomponents $T_{Ms}$ provided by the tracking unit and the predicted subcomponents $T_{Ms,pred}$ is determined for each possible error value k.

The difference is determined separately for each error value k, but combined for all tracked satellites as prediction error $dT_{pred}$, by the equation:

$$dT_{pred}=\sum_{i}|T_{Ms,i,pred}-T_{Ms,i}|$$

where i refers again to the respective satellite.

The value of k which results in the lowest prediction error $dT_{pred}$ is assumed also in this second embodiment to constitute the correct error value $k_{best}$. Thus, the most probable accurate time of transmission $T_{TOT,1}$ of the ranging code from the master satellite can be calculated in accordance with one of the above equations to be:

$$T_{TOT,1}=T_{TOT,0}+k_{best}M+\text{Corrections}.$$

The value "Corrections" in the equation is used as in the first embodiment to further compensate for a bias in the determined time of transmission. This calculation is indicated in the fourth step of FIG. 1.

In the last step of FIG. 1, the most probable estimate for the time of arrival $T_{curr}$ of the ranging code from the master satellite is calculated to be:

$$T_{curr}=T_{TOT,1}+T_{TOF,1}.$$

This current time $T_{curr}$ constitutes at the same time the time of arrival of the ranging codes from the other satellites and the accurate GPS time at the receiver at the time of arrival of the different ranging codes.

In the second embodiment of the invention, signals from several satellites are tracked, and the time of transmission of a respective ranging code from all these satellites might be of interest, for instance for determining the position of the GPS receiver as described in the background of the invention.

The time of transmission of the ranging codes not originating from the master satellite can be estimated in a similar manner as the time of transmission of the ranging code originating from the master satellite. Alternatively, the respective times of transmission can be predicted from the determined current time $T_{curr}$ with the equation:

$$T_{TOT,i}=\text{floor}(0.5+(T_{cur}-T_{TOF,i}-T_{Ms,i}-\text{Corrections})/M)*M+T_{Ms,i}.$$

Also in this equation, i refers again to the respective satellite.

It is to be noted that the described embodiments of the invention constitute only two of various possible embodiments. Other embodiments of the invention could also be hybrids of the two described embodiments.

What is claimed is:

1. A method for determining an accurate time of transmission of a signal part of a code modulated signal transmitted by a beacon of a positioning system and received by a receiver of said positioning system, which receiver tracks beacon signals with a tracking unit, said method comprising:
    a) obtaining from said tracking unit a measured subcomponent of the time of transmission of at least two signal parts of at least one beacon signal, said subcomponent indicating the difference in time between on the one hand a detected regularity in a beacon signal comprising the respective signal part and on the other hand the respective signal part itself;
    b) predicting a plurality of expected subcomponents for each of said at least two signal parts based on available estimates of the time of arrival and of the time of flight of the respective signal part, assuming for each prediction a different total error within a known interval of possible total errors;
    c) determining for each of said expected subcomponents separately the combined difference between said measured and said expected subcomponent for each of said at least two signal parts; and
    d) calculating the time of transmission of at least one of said signal parts based on the total error resulting in the smallest combined difference between a measured and an expected subcomponent.

2. A method according to claim 1, wherein said code employed for modulating said beacon signals has a predetermined epoch and said time subcomponent is a sub millisecond component of the time of transmission of a respective signal part, which sub millisecond component is determined based on detected epoch changes in the beacon signal with the respective signal part, or wherein said time subcomponent is a sub 20 millisecond component of the time of transmission of a respective signal part, which sub 20 millisecond component is determined based on detected bit edges in the beacon signal with the respective signal part.

3. A method according to claim 1, wherein said at least two signal parts are transmitted at different instances of time by the same beacon as parts of the same signal.

4. A method according to claim 3, wherein determining for each of said different total errors separately the combined difference between said measured and said expected time subcomponent for each of said at least two signal parts comprises:
    determining the time of transmission $T_{TOT,1}$ of a first signal parts as:

$$T_{TOT,1}=\text{floor}(0.5+(T_{init}-T_{TOF}-T_{Ms}-\text{Corrections})/M)*M+T_{Ms}+kM,$$

wherein $T_{init}$ is said estimate of the time of arrival of said first signal part, wherein $T_{TOF}$ is said estimate of the time of flight of said first signal part, wherein $T_{Ms}$ is said measured subcomponent for said first signal part, wherein M is the time unit of said subcomponent, wherein "Corrections" is a known correction value, and wherein k is an integral error value lying within a known interval and determining the possible total error in the equation;

estimating the position of said beacon at the time of transmission of said first signal part;

determining a refined time of flight $T_{TOF,i}$, with i=1, for said first signal part from an estimated position of said receiver and from said estimated position of said beacon;

estimating a refined time of arrival $T_{curr,i}$, with i=1, of said first signal part as the sum of said time of transmission $T_{TOT,1}$ and said refined time of flight;

determining estimates for the time of arrival $T_{curr,i}$ of signal parts following said first signal part based on the estimated refined time of arrival of said first signal part and on local clock counts between the time of arrival of said first signal part and said following signal parts;

refining the time of flight $T_{TOF,i}$ of said following signal parts based on the respective time estimates of the time of arrival of said following signal parts;

predicting an expected time subcomponent $T_{Ms,i,pred}$ for each of said at least two signal parts as:

$T_{Ms,i,pred}=mod(T_{curr,i}-T_{TOF,i}-\text{Corrections},M)-\text{residual of }(T_{curr,i}-T_{TOF,i})/(M \text{ seconds})$, wherein i identifies the respective signal part; and calculating separately for each error value k a combined difference between said measured subcomponents and said expected subcomponents for all of said at least two signal parts.

5. A method according to claim 1, wherein said at least two signal parts are transmitted by at least two different beacons.

6. A method according to claim 5, wherein said at least two signal parts are received at said receiver basically at the same instance of time.

7. A method according to claim 6, wherein determining for each of said different total errors separately the combined difference between said measured and said expected subcomponent for said at least two signal parts comprises:

determining the time of transmission $T_{TOT,1}$ of a first signal part transmitted by a first beacon as:

$T_{TOT,1}=\text{floor}(0.5+(T_{init}-T_{TOF}-T_{Ms}-\text{Corrections})/M)*M+T_{Ms}+kM$, wherein $T_{init}$ is said estimate of the time of arrival of said first signal part, wherein $T_{TOF}$ is said estimate of the time of flight of said first signal part, wherein $T_{Ms}$ is said measured subcomponent for said first signal part, wherein M is the time unit of said subcomponent, wherein "Corrections" is a known correction value, and wherein k is an integral error value lying within a known interval and determining the possible error in the equation;

estimating the position of said first beacon at the time of transmission of said first signal part;

determining a refined time of flight $T_{TOF,i}$, with i=1, for said first signal part from an estimated position of said receiver and from said estimated position of said first beacon;

estimating a refined time of arrival $T_{curr}$ of said first signal part as the sum of said time of transmission $T_{TOT,1}$ and of said refined time of flight;

estimating the positions of said other beacons at the time of transmission of the respective other signal parts based on the estimated refined time of arrival $T_{curr}$ of said first signal part;

refining the time of flight $T_{TOF,i}$ of said other signal parts based on the calculated positions of said other beacons;

predicting the expected time subcomponent $T_{Ms,i,pred}$ for each of said at least two signal parts as:

$T_{Ms,i,pred}=mod(T_{curr,i}-T_{TOF,i}-\text{Corrections},M)-\text{residual of }(T_{curr,i}-T_{TOF,i})/(M \text{ seconds})$, wherein i identifies the respective beacon; and calculating separately for each error value k a combined difference between said measured subcomponents and said expected subcomponents for the respective signal part from all of said at least two beacons.

8. A method according to claim 7, wherein the beacon transmitting the signal parts which are received best at said receiver is selected as first beacon.

9. A method according to claim 7, wherein at least two of said at least two beacons are treated subsequently as first beacon for determining a time of transmission $T_{TOT,1}$ of a signal part transmitted by the respective first beacon.

10. A method according to claim 1, wherein said combined difference between said measured and said expected time subcomponent for said at least two signal parts is determined as sum of the absolute differences or as sum of the squared differences for all of said at least two signal parts.

11. A method according to claim 1, wherein said minimum of the combined difference between said measured and said expected time subcomponent for said at least two signal parts is determined based on an integer least square method.

12. A method according to claim 1, wherein calculating the estimated time of transmission of at least one of said signal parts in step d) of the method of claim 1 is based in addition on a known correction value.

13. A method according to claim 12, wherein said time of transmission $T_{TOT,1}$ of at least one of said signal parts is calculated as $T_{TOT,1}=\text{floor}(0.5+(T_{init}-T_{TOF}-T_{Ms}-\text{Corrections})/M)*M+T_{Ms}+k_{best}M$, wherein $T_{init}$ is said estimate of the time of arrival of said signal part, wherein $T_{TOF}$ is said estimate of the time of flight of said signal part, wherein $T_{Ms}$ is said measured time subcomponent of said signal part, wherein M is the time unit of the time subcomponent, wherein "Corrections" are available correction values, and wherein $k_{best}$ is said error value k resulting in the smallest combined difference.

14. A method according to claim 1, further comprising calculating the time of arrival of at least one of said signal parts as the sum of the calculated time of transmission of said signal part and the time of flight of said signal part, wherein said time of flight is determined based on an available estimate of the position of the receiver and on a calculated position of the beacon transmitting said at least one signal part at the time of transmission of said signal part.

15. A method according to claim 14, wherein said time of arrival of said at least one said signal part is used as a basis for determining the time of transmission of signal parts originating from other beacons than said at least one signal part.

16. A method according to claim 14, further comprising performing a cross-correlation between a received signal part and an expected signal part for a further refinement of said determined time of arrival of at least one signal part, which expected signal part is determined based on said calculated time of arrival and on available orbital parameters of said beacon.

17. A method according to claim 1, wherein said beacons are satellites.

18. A method according to claim 17, wherein said receiver is a GPS receiver and wherein said satellites are GPS space vehicle.

19. A method according to claim 1, wherein said beacons are base stations of a network.

20. A receiver comprising means for receiving and tracking signals from at least one beacon and processing means for realizing the steps of the method according to claim 1.

21. A positioning system comprising a receiver and at least one network element of a network, said receiver including means for communicating with said network, receiving means for receiving and tracking signals from at least one beacon and processing means for realizing the steps of the method according to claim 1.

22. A positioning system according to claim 21, wherein said network element includes means for providing said receiver with assistance information.

23. A positioning system according to claim 21, wherein said network is a mobile communication network.

24. A positioning system comprising a receiver and a processing unit external to said receiver, said receiver including receiving means for receiving and tracking signals from at least one beacon and means for providing received and tracked beacon signals to said processing unit, and said processing unit including means for realizing the steps of the method according to claim 1.

25. A positioning system according to claim 24, further comprising at least one network element of a network, wherein said processing unit comprises means for communicating with said network element, and wherein said network element includes means for providing said processing unit with assistance information.

26. A positioning system according to claim 25, wherein said network is a mobile communication network.

* * * * *